FIP8102 XR 3,120,643

X5373D X5229E

RSO SD 6

Feb. 4, 1964 R. A. WATERS 3,120,643

380+
422+

CHASSIS FOR ELECTRICAL ACCESSORIES AND THE LIKE

Filed Aug. 27, 1962

2 Sheets-Sheet 1

INVENTOR.
Robert A. Waters
BY
Stone, Mieman, Burmeister & Zummer
Att'ys.

chassis per se

Feb. 4, 1964 R. A. WATERS 3,120,643

CHASSIS FOR ELECTRICAL ACCESSORIES AND THE LIKE

Filed Aug. 27, 1962 2 Sheets-Sheet 2

INVENTOR
Robert A. Waters
BY
Stone, Nieman, Burmeister & Zummer
Attys.

1 2

3,120,643

CHASSIS FOR ELECTRICAL ACCESSORIES AND THE LIKE

Robert A. Waters, Weston, Mass., assignor to Waters Manufacturing, Inc., Wayland, Mass., a corporation of Massachusetts Filed Aug. 27, 1962, Ser. No. 219,688
5 Claims. (Cl. 325—496)

This invention relates to an improvement in the structure for housing or mounting electrical and electronic circuits having manual controls, particularly circuits of the type used as accessories to other equipment. More specifically, the invention relates to a construction for an electrical or electronic chassis having control elements such as potentiometers and switches, operable from a front panel having identifying or position-indicative legends, adaptable to being mounted in a position producing either a horizontal or vertical orientation of the panel, with the legends (words, letters, numbers, etc.) being presented in upright position for the selected mounting orientation.

The embodiment of the invention illustrated in the annexed drawing employs the teachings of the invention in connection with a typical item of electrical or electronic accessory equipment, the particular item selected for illustration being an accessory in common use by operators of amateur radio stations, known as a "phone patch." For purposes of the present invention, the details of function and construction of this type of electrical or electronic circuit need not be understood in detail, it being adequate for purposes of understanding of the invention merely to know that such a device is an item of equipment normally sold as a separate accessory to persons owning a transmitter and a receiver, the function of the simplest form of the device being to connect the "station" (transmitter and receiver) to a telephone line so that two-way conversations with another station can be carried on by telephone; the signal (normally voice) transmitted by the station originates at the opposite end of the phone line and the received signal is likewise transmitted to the opposite end of the phone line; the voice-operated relay commonly used for switching between receiver and transmitter with ordinary operation thereof, i.e., employing a microphone with the transmitter and a loudspeaker for the output of the receiver, permits the person at the remote end of the telephone line to carry on a two-way conversation in a manner similar to that of ordinary phone conversation. To this basic function, commercially manufactured phone patch accessories add a greater or less number of additional possible functions, including the connection of a tape recorder into the circuit to permit recording of the station operation, either with or without the phone patch connection, and also connection of the tape recorder to the station for "play-back" of recorded material through the transmitter, or for play-back of the recorded material to the line, or both simultaneously, etc. In the operation of such an accessory, the receiver output and the loudspeaker, directly connected in "normal" operation, are connected to appropriate terminals on the phone patch accessory, as are the microphone, the transmitter input and the phone line and (where such facilities are provided) the input and output, respectively, of a tape recorder. The mode of interconnection for desired operation is accomplished by a "function switch," normally a rotatable switch adjusted from the front panel of the accessory. Additionally, there are provided on the front panel controls for the "volume" or amplitude of the receiver output and transmitter input signals (operative in the modes or function positions in which the receiver and transmitter operation are not merely "normal") to permit the proper attenuation of these signals required, for example, to produce the proper voice-signal amplitude for modulation of the transmitter from the phone line and to put on the phone line from the receiver output a voltage producing the required sound volume to simulate normal telephone reception, without the necessity of upsetting the generally similar controls provided individually on the receiver and transmitter themselves. The function switch and these auxiliary volume controls or attenuators are normally operable from a front panel of the chassis of the accessory, other adjustments, etc., less frequently used being (as is common to all electronic equipment) placed in less accessible locations such as on a back panel or within the chassis or cabinet.

As previously indicated, the details of the operation of the type of accessory described above are not necessary to understanding of the present invention, the function of the switch and potentiometers mentioned being merely typical of the types of functions served by manually operable controls in a variety of electrical and electronic equipment, and particularly equipment of an accessory type, with which the present invention may advantageously be employed. The objects or purposes of the present invention may readily be understood in their broader aspects by further considering the same example as regards features of construction desirably incorporated in such equipment. A typical electrical or electronic chassis presents from the front a generally rectangular aspect, the dimension which is horizontal when the device is placed on a table or similar support generally being substantially larger than the vertical dimension. Such equipment, like all generally similar equipment, is normally provided with surface-protective supports on the bottom, such as rubber feet, felt, etc., for preventing scratching and also to provide an air-barrier, particularly where the chassis is likely to be placed atop a device of high heat generation, such as a transmitter normally is.

There are many instances where the table space required for such an accessory is prohibitive, and the "stacking" of additional equipment atop other equipment cannot readily be done. It is often desirable to attach the accesory to the side of an item of more bulky equipment in the "vertical" mounting position, i.e. with the panel in quadrature with the position previously described, the long dimension being the vertical dimension.

When a control panel designed for horizontal mounting is mounted vertically, the numerical and literal legends become virtually unusable, and additionally the appearance is so obviously makeshift as to be affirmatively objectionable. Accordingly, manufactures of various types of electronic equipment, and particularly equipment of an accessory nature for use with larger items, frequently provide in some fashion for "universal" mounting of the equipment, giving the proper upright position of the panel legends in either the horizontal or vertical position. Not uncommonly, the legends are provided in the form of decals, either an entire decal panel covering for each possible position or individual control legends adapted to be placed on the panel in appropriate orientation for the vertical or horizontal mounting. Such solutions of the problem are undesirable, both because the installation of decals or similar legends by the user is found unattractive to purchasers and because in any event decals and similar legends are incapable of the pleasing and permanent appearance given to the metal panels of modern electronic equipment by silk-screening and similar processes. The alternative of providing interchangeable panels is generally prohibitive in cost from a commercial standpoint, it being an absolute requirement that such a feature add so little to the cost that the product remains fully competitive with other similar products when sold to persons not particularly expecting to use the vertical mounting feature.

The economics of carrying separate "models" for the two kinds of mounting, or of selling vertical panels as an extra-cost addition, are likewise prohibitive.

It is accordingly the principal object of the present invention to provide a construction for a chassis or housing of the type mentioned which is suited for vertical or horizontal mounting and which displays the appropriate legends on the control panel in either orientation in the upright position with an adjustment simply made by the user, this facility being provided in a manner of negligible cost. This problem being solved by the invention in a satisfactory manner, it is a further object of the invention to provide in combination with the principal structure a novel and simple manner of attachment of the chassis to a vertical support panel or mount such as the side wall of a principal item of equipment (the transmitter or receiver in the example mentioned) which employs the surface-protective support normally on the bottom surface for protection of the vertical surface to which the device is attached in such installation, at substantially no additional cost of construction.

In its broader aspects, the invention may easily be understood from the statement that in the present construction the panel has on both faces thereof substantially identical informational legends regarding the control member or members which are operable therefrom, the legends on opposite faces of the panel being upright in quadrature-related orientations of the panel in its plane, so that the user may simply reverse the panel to display the legends upright in the horizontal or vertical orientation of the chassis. The best construction places all of the control elements in symmetrical relation with respect to at least one axis of symmetry of the panel, thus permitting the same apertures to be employed for passing the control members in both the mutually reversed positions of the panel. However, although less advantageous both from the standpoint of cost and appearance, the invention in its broadest aspects contemplates the possibility that all apertures used in the reversal will not be completely identical, particularly where the unused apertures will be covered by the knobs or dials which are virtually universally secured to the outer ends of the shafts of the control members. In combination with this panel construction, there is employed a novel, but simple, provision for securing the chassis to a vertical surface for vertical mounting, the rubber feet or other surface-protective support being mounted to the chassis by screws or similar fasteners of sufficient excess length so that these same screws may be removed and then reinserted through suitable apertures in the vertical surface, the rubber feet or other surface-protective support then serving as protection for the exterior surface of the equipment to which the accessory is mounted and also serving the other purposes of heat-insulation, etc., in the same manner as when employed for mere resting of the equipment in the horizontal orientation on a table or other surface.

For understanding of further novel principles of construction employed in accordance with the invention, and for more complete understanding of the basic construction described above, reference is made to the embodiment of the invention illustrated in the annexed drawing in accordance with the patent laws. In the drawing.

Figure 1:
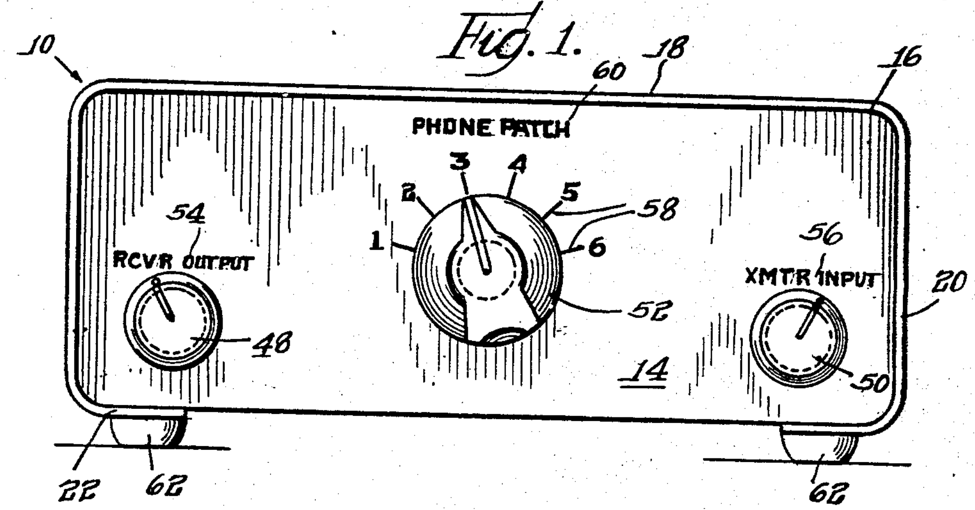
FIGURE 1 is a view in front elevation of a phone patch accessory for amateur radio equipment employing the features of construction provided by the invention.

The phone patch device or accessory previously described is shown in the drawing as mounted or incorporated in a housing generally designated by the numeral 10, consisting of a fixed or main chassis portion 12 and a front panel 14. An ornamental and protective sheet-metal cover 16 has an integral top 18, sides 20, and inwardly extending bottom flanges 22. A rear panel assembly 24 at the back of the chassis is shown only in the view of FIGURE 2, this panel, having certain semi-permanent adjustment members and also the various terminals and jacks for connection of the components which are inter-connected by the accessory, is formed integrally with the main chassis 12, this portion of the device not being relevant for present purposes and therefore not being further described.

The forward end of the main chassis 12, which constitutes in essence, in this case, a unitary plate of suitably heavy sheet-metal, is provided at each side with upstanding ears or tabs 26, apertured to register with apertures 28 (FIGURE 3) in the front panel near the right and left ends thereof in positions symmetrically related to the vertical center line in the position shown in FIGURE 1. The front panel 14 also has a further aperture 30 at the center of its long dimension, all of these apertures accordingly being symmetrically located with respect to an axis of the panel (in this case the center-line across the short dimension).

Figure 7:
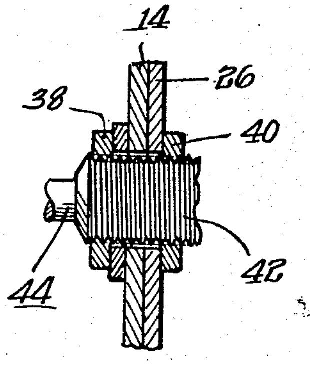
FIGURE 7 is a fragmentary sectional view taken along the line 7—7 of FIGURE 3 in the direction indicated by arrows.

Potentiometers 32 and 34 are mounted in the apertures 28 and a multiple-position rotary switch of the ganged-wafer type 36 is mounted in the central aperture 30. The parts are mounted in the well-known manner universally employed in the mounting of such parts having "mounting bushings," as illustrated in FIGURE 7, showing the front mounting nut 38 and the rear nut 40 mounted threadedly on the bushing 42 (in this case of the potentiometer 32), from which the shaft 44 extends forwardly, the nuts 38 and 40 clamping the apertured panel 14 and ear or tab 26 between them and thus securely mounting the potentiometer. The similar mounting of the potentiometer 34 produces the result, in addition to mounting of the potentiometers, that the panel 14 is securely mounted to the chassis 12 by these front mounting nuts on the bushings. The switch 36 is mounted solely to the panel, the chassis 12 having no portion at this point of mounting, thus eliminating the necessity for sequential tightening of nuts, etc., which would be required in mounting or remounting the panel and control elements if all components were to be mounted through registered apertures.

The potentiometers 32 and 34 and the switch 36 are provided with conventional knobs or dials 48, 50 and 52 respectively, secured to the shafts after assembly or reassembly.

As shown in FIGURE 1, the knob 48 has adjacent to it the descriptive legend "RCVR Output" and the knob 50 is similarly designated by the legend "XMTR Input," these legends, designated as 54 and 56, showing the functions of the respective potentiometers in the circuit. The switch knob 52, of the pointer type, has associated therewith function indications of the six illustrated positions of the switch. For purposes of simplicity of illustration, these indications or legends are shown as the numerals "1" through "6," but it will be understood that in an actual commercial embodiment of the illustrated device, these position-numbers, of arbitrary import, are replaced by completely descriptive legends, including "Record Station," "Playback to Transmitter," "Off," etc., the reading of legends of this type rapidly as required for efficient use of the device being extremely difficult when a panel such as shown in FIGURE 1 is oriented with its long dimension extending vertically.

Figures 2, 3:
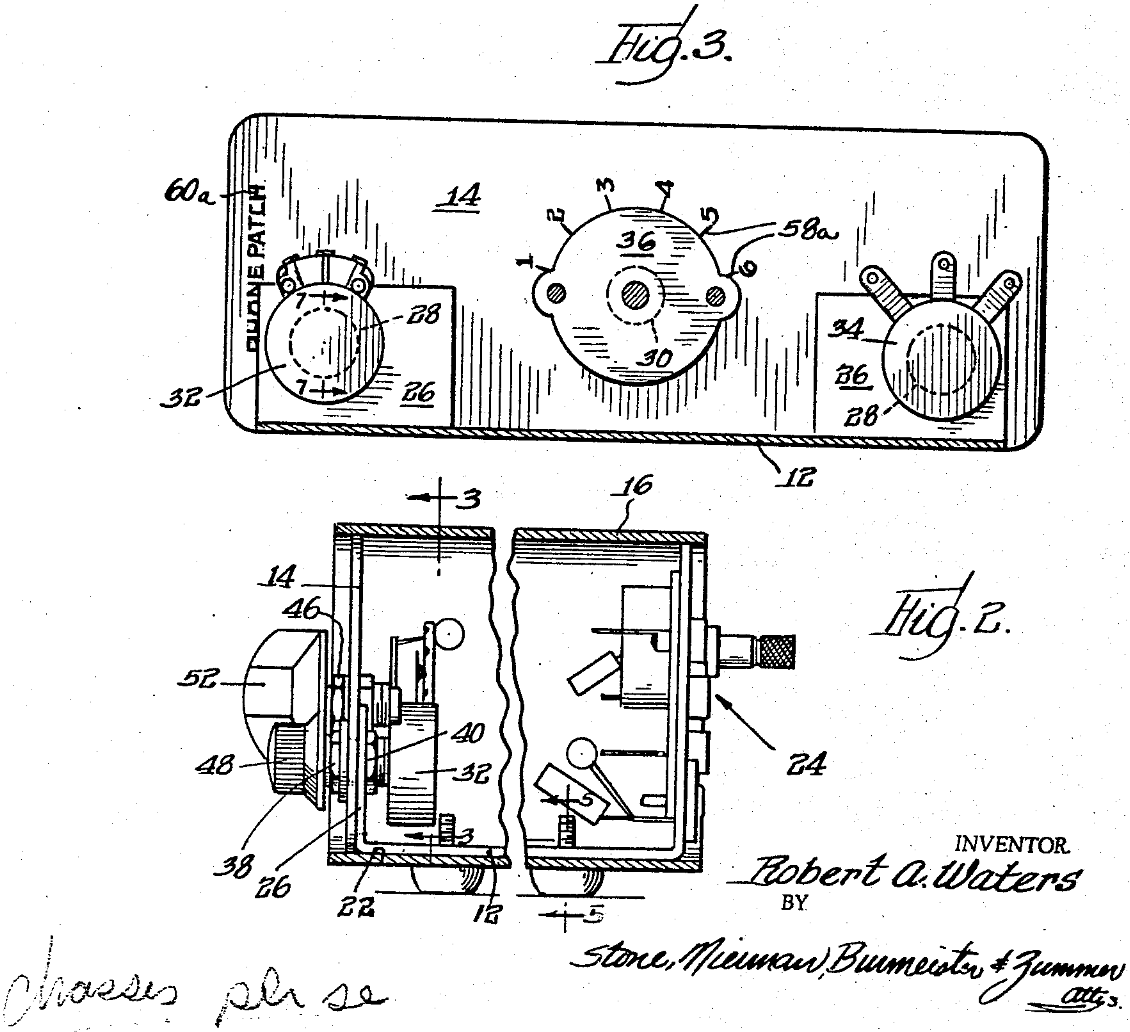
FIGURE 2 is a view in side elevation of the device of FIGURE 1, with a protective or ornamental cover constituting a part of the device broken away in section for convenience of illustration, the electrical components and connections of the circuit within the housing being omitted except as relevant to the present invention.
FIGURE 3 is a sectional view taken along the line 3—3 of FIGURE 2 in the direction indicated by arrows in that figure.
Figure 4:
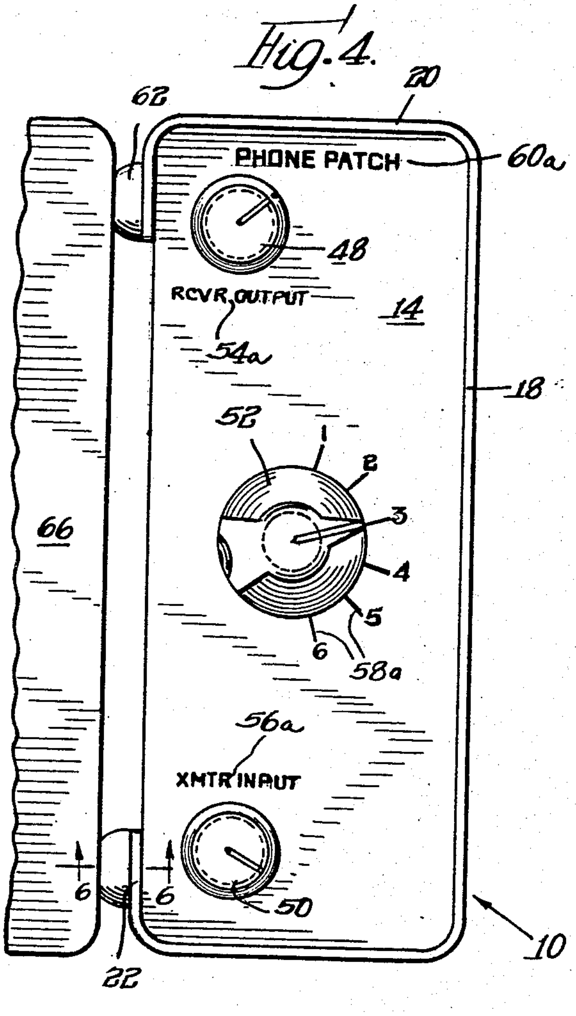
FIGURE 4 is a view in front elevation of the device with the front panel reversed, the device being mounted in the vertical position in the illustration of this figure.

As shown in FIGURE 3 (except for a portion concealed in that figure but visible in FIGURE 4), the reverse side of the panel 14 has identical legends to those displayed on the front side, but adjacent to the respective apertures which are reversed about the axis of symmetry and oriented, furthermore, upright with respect to the vertical, rather than the horizontal, orientation of the panel. Thus the legends 54*a*, 56*a* and 58*a* correspond to the legends 54, 56 and 58, respectively, except for the matter of orientation. To complete the elimination of not only functional, but also appearance, makeshift, the description of the product "Phone Patch," shown at 60 in FIGURE 1, is oriented similarly at the top of the panel at 60*a* when the panel is reversed and the device vertically mounted as shown in FIGURE 4.

The panel may readily be reversed to place the device in proper condition for either type of mounting, the simple operations of removing the knobs and the mounting nuts for the components freeing the panel for reversal and reassembly. This operation may easily be performed by the user or the dealer (to whom the economic factor of avoiding the stocking of models for various types of mounting is extremely important).

Figure 5:
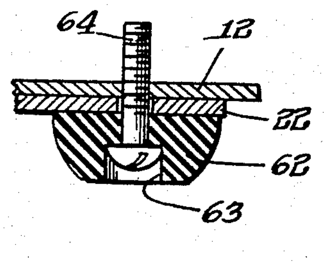
FIGURE 5 is a fragmentary enlarged sectional view taken along the line 5—5 of FIGURE 2 in the direction indicated by arrows in that figure.
Figure 6:
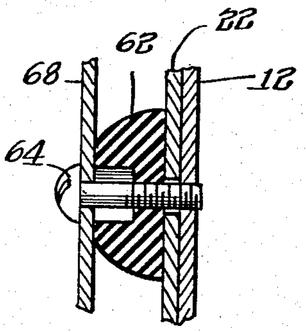
FIGURE 6 is a fragmentary view taken along the line 6—6 of FIGURE 4 in the direction indicated by arrows.

In FIGURE 5 are shown the details of mounting of the rubber feet 62. These are provided, as is conventional, with a center recess 63 receiving the head of a mounting screw 64, this construction being conventional except for the provision of a substantial excess length of the screw 64 which extends well into the housing in the present construction, beyond its threaded engagement with the main chassis 12. Additionally, as will be seen best in FIGURE 5, the screws 64 also serve to lock the cover 16 by passing through suitable apertures in the bottom flanges 22 thereof. As shown in FIGURE 6, the elongation of the screws 64 is used for mounting the phone patch to the side panel of a device such as a transmitter to which it is an auxiliary or accessory, this support being shown schematically at 66 in FIGURE 4, and the side panel of its housing being shown at 68 in FIGURE 6. The elongated screw 64 is used for this mounting through suitable apertures in the wall or panel 68, the feet 62 serving the same purposes in such assembly as when resting on a horizontal surface. The panel 68 may be specially apertured for the purpose, or existing apertures, such as the mesh grille used on the side of a transmitter, may be employed.

Many modifications of the illustrated structure will readily be devised by persons skilled in the art, some fully utilizing the maximum advantages obtainable from the invention, and others utilizing them only in part. For example, it will be obvious that any axis of symmetry may be used where this aspect of the invention is practiced, such as the center-line along the long dimension, or a diagonal. Likewise, although the particular manner of fastening the panel and mounting the components is particularly advantageous, the broader aspects of the invention may be employed, for example, with all control elements permanently mounted to the chassis, with the panel secured to the chassis by separate fasteners, or conversely with all control elements mounted on the panel, separate fasteners again being used for mounting of the panel. Likewise, many variations of the structure for vertical mounting may readily be devised.

Accordingly, the scope of the invention should not be considered to be limited by the particular embodiment thereof illustrated in the drawing, but should be determined in terms of the structures set forth in the annexed claims, and equivalents thereof.

What is claimed is:

1. An electrical equipment chassis suited for vertical or horizontal mounting comprising:

(*a*) a circuit having at least one element with a manually operable control member thereon and (*b*) a housing having a fixed portion containing the circuit and including a reversible panel having an aperture passing the control member, the panel having on both faces thereof substantially identical informational legends regarding the control member, (*c*) the legends on opposite faces being upright in quadrature-related orientations of the panel in its plane, so that the panel may be reversed to display the legends upright in horizontal or vertical orientation of the chassis.

2. The electronic equipment chassis of claim 1 having a plurality of such circuit elements all symmetrically disposed with respect to at least one center-line of the panel, the panel having the same plurality of symmetrically disposed apertures passing the control members.

3. The electronic equipment chassis of claim 1 having a surface-protective support on the bottom surface thereof, the bottom surface of the support being recessed, and the support being secured to the chassis by a fastener member having its outer end in the recess and its inner end engaging the chassis, the fastener member having substantial excess length so that it may be removed and reinserted to secure the chassis to other equipment.

4. The electronic equipment chassis of claim 1 wherein the fixed portion of the chassis has a surface abutting the rear surface of the panel, the control member being of the type having an externally threaded forwardly extending bushing with a front mounting nut thereon, said surface being apertured in register with the panel aperture, and the mounting nut for the circuit element being on the outer face of the panel and securing the panel to the fixed portion of the chassis and securing the circuit element to both.

5. An electronic equipment chassis having a plurality of circuit elements with control members mounted as set forth in claim 4, and having at least one additional such circuit element having its control member extending through the panel, but secured to only one of said panel and said fixed portion.

No references cited.